United States Patent [19]

Osselaere et al.

[11] Patent Number: 4,466,230

[45] Date of Patent: Aug. 21, 1984

[54] AUTOMATIC FAN SPEED ADJUSTER FOR COMBINE HARVESTER

[75] Inventors: Guy H. J. Osselaere, Loppem-Zedelgem; Daniël M. Danhieux, Gent, both of Belgium

[73] Assignee: Sperry Corporation, New Holland, Pa.

[21] Appl. No.: 377,534

[22] Filed: May 12, 1982

[30] Foreign Application Priority Data

May 20, 1981 [GB] United Kingdom ................ 8115419

[51] Int. Cl.$^3$ ........................ A01F 12/48; A01D 41/00
[52] U.S. Cl. ............................. 56/10.2; 56/DIG. 15; 130/27 HF; 209/261; 209/318
[58] Field of Search ....................... 56/10.2, DIG. 15; 130/24, 25, 26, 21, 27 HF; 209/26, 261, 318

[56] References Cited

U.S. PATENT DOCUMENTS 3,827,442 8/1974 Scholz ........................ 56/DIG. 15
4,259,829 4/1981 Strubbe ................................ 56/10.2

FOREIGN PATENT DOCUMENTS

868619 4/1971 Canada .

*Primary Examiner*—Robert P. Swiatek
*Assistant Examiner*—David I. Tarnoff
*Attorney, Agent, or Firm*—Larry W. Miller; Frank A. Seemar; Darrell F. Marquette

[57] ABSTRACT

A combine harvester having threshing and separating mechanism, sieve through which crop material separated by the threshing and separating mechanism passes, cleaning mechanism having a fan operable to blow air through the sieve and hence clean the crop material on the sieve, the fan being driven by variable speed drive, sensor operable to sense the fore-and-aft inclination of the machine and produce a signal representative thereof, a device for selecting a nominal rotational speed for the fan during operation of the machine on level ground and producing a signal representative of that nominal speed, a device for combining the inclination signal and the nominal speed signal to produce a signal representative of the desired speed of the fan as a function of the fore-and-aft inclination of the machine, mechanism for measuring the actual rotational speed of the fan, and control mechanism responsive to the desired fan speed signal and the actual fan speed signal to produce a command signal for application to the variable speed drive, whereby the rotational speed of the fan is adjusted as a function of the fore-and-aft inclination of the machine.

8 Claims, 8 Drawing Figures

AUTOMATIC FAN SPEED ADJUSTER FOR COMBINE HARVESTER

BACKGROUND OF THE INVENTION

This invention relates to combine harvesters and has particular reference to the problems arising from the operation of such machines on ground which is inclined in a fore-and-aft direction of the machines.

As is well known, combine harvesters comprise sieve means to which threshed crop material is passed, the crop material being cleaned while on the sieve means by a fan which operates to blow air through the sieve means so as to render airborne the unwanted material (known as chaff) and impurities such as dust. This allows the thus cleaned grain to pass through the sieve means to a clean grain collecting point for subsequent transfer to a grain tank.

When a combine harvester is operating on ground which is inclined in a fore-and-aft direction of the machine, grain and impurities tend either to accumulate at the front end or to spill over the rear end of the sieve means, depending on whether the machine is experiencing a downward or upward incline, respectively. It is recognized that the amount of air flowing through the sieve means needs to be adjusted according to the nature of the inclination being experienced and U.S. Pat. No. 3,827,442 discloses one method of achieving this objective. The fan of this known arrangement is driven by a variable drive device which is adjusted mechanically according to the nature of the ground inclination, a pendulum being employed for this purpose.

This known arrangement suffers from the fact that it is entirely mechanical and is subject, therefore, to failure due to wear and/or breakage of components or, more importantly, to impaired operation as a result of build-up of dirt, for example, on the components of the linkage system which interconnects the pendulum and the variable drive device. Furthermore, this linkage system is relatively complex and hence expensive. Also the sensitivity of such a mechanical arrangement is not normally impressive.

SUMMARY OF THE INVENTION

It is an object of the present invention to provide a combine harvester having an improved fan speed control arrangement which operates as a function of the fore-and-aft inclination of the machine.

According to one aspect, the present invention provides a combine harvester comprising threshing and separating means, sieve means to which crop material seperated by the threshing and separating means passes, cleaning means having fan means operable to blow air through the sieve means and hence clean the crop material on the sieve means, the fan means being driven by variable speed drive means, sensor means operable to sense the fore-and-aft inclination of the machine and produce a signal representative thereof, means for selecting a nominal rotational speed for the fan means during operation of the machine on level ground and producing a signal representative of that nominal speed, means for combining the inclination signal and the nominal speed signal to produce a signal representative of the desired speed of the fan means as a function of the fore-and-aft inclination of the machine, means for measuring the actual rotational speed of the fan means, and control means responsive to the desired fan speed signal and the actual fan speed signal to produce a command signal for application to the variable speed drive means, whereby the rotational speed of the fan means is adjusted as a function of the fore-and-aft inclination of the machine.

In a preferred embodiment, means are provided for establishing a selected relationship between the fore-and-aft inclination of the combine harvester and the rotational speed of the fan means and adjusting the signal from the sensor means accordingly, whereby that signal is proportional to the desired fan speed as a function of the fore-and-aft inclination. The means for establishing the selected relationship are preferably in the form of a variable potentiometric device, whereby said relationship can be adjusted.

Means are also provided for setting a minimum rotational speed for the fan means below which speed the fan means cannot be commanded to fall. Further means are provided for monitoring grain loss and producing a signal representative thereof, the grain loss signal being used to prevent any further increase in the rotational speed of the fan means being commanded when that signal reaches a predetermined value. Preferably, the grain loss monitor means comprise a grain loss sensor associated with the sieve means and operable to sense the volume of grain passing over the rear edge of the sieve means at the location of the sensor, and adjustable means for establishing a signal representative of a predetermined maximum grain loss, any further increase in the rotational speed of the fan means being prevented once the grain loss signal exceeds the predetermined maximum grain loss signal.

Means may also be provided for preventing any further alteration of fan speed when the latter is below a certain threshold (for example 400 r.p.m.) such as when the fan drive is disengaged and/or upon the failure of certain components such as drive belts, for example.

The sensor means preferably comprise an inclinometer comprising at least one photoelectric device operable to produce one output signal when illuminated and a different output signal when not illuminated, and means for interrupting the illumination of the photoelectric device, said means comprising a transparent tubular member containing an opaque object movable within the bore of the tubular member, the tubular member being arranged such that the opaque member slides into or out of the path of illumination of the photoelectric device dependent upon the inclination to which the tubular member is subjected. A photoelectric device may be associated with each end of the tubular member so that upon tilting of the tubular member the illumination of one or other photoelectric device is interrupted by the opaque member depending upon the direction of inclination of the tubular member.

The tubular member may be of glass and slightly arcuate to stabilize the opaque member centrally thereof when the tubular member is generally horizontal. The opaque member may be a ball and the or each photoelectric device may be arranged to produce an electric output signal when the illumination thereof is interrupted, the output signal being used to actuate an electric motor which drives the tubular member back to the generally horizontal position and also drives the wiper arm of a variable potentiometer which thus produces an output signal proportional to the extent of tilting of the tubular member and hence proportional to the fore-and-aft inclination being experienced by the machine.

According to another aspect, the present invention provides an inclinometer comprising at least one photoelectric device operable to produce one output signal when illuminated and a different output signal when not illuminated, and means for interrupting the illumination of the photoelectric device, said means comprising a transparent tubular member containing an opaque object movable within the bore of the tubular member, the tubular member being arranged such that the opaque member slides into or out of the path of illumination of the photoelectric device dependent upon the inclination to which the tubular member is subjected.

A photoelectric device may be associated with each end of the tubular member so that upon tilting of the tubular member the illumination of one or other photoelectric device is interrupted by the opaque member depending upon the direction of inclination of the tubular member. Preferably, the tubular member is arcuate so as to assist in locating the opaque member centrally thereof in the neutral position of the inclinometer, a curvature such that the respective ends of the tube define an included angle of 179° being found acceptable. The opaque member may be a metal ball fitting closely within the bore of the tubular member so that movement thereof within the latter is damped by air.

The inclinometer further comprises an electric motor actuable by one or each photoelectric device and operable to drive the tubular member, and a variable potentiometer having its wiper arm arranged for rotation by the electric motor, the arrangement being such that the or each photoelectric device produces an output signal when the illumination of that device is interrupted, that output signal being operable to drive the electric motor in a sense to return the tubular member to a generally horizontal position in which the ball will resume its central position of the tubular member and hence re-establish illumination of that photoelectric device which was previously interrupted. The rotation of the wiper arm of the variable potentiometer produces an output signal proportional to the extent of tilting of the tubular member, and hence proportional to the fore-and-aft inclination being experienced by the machine.

BRIEF DESCRIPTION OF THE DRAWINGS

A combine harvester embodying the present invention will now be described in greater detail, by way of example, with reference to the accompanying drawings, in which.

DETAILED DESCRIPTION OF THE PREFERRED EMBODIMENT

Figure 1:
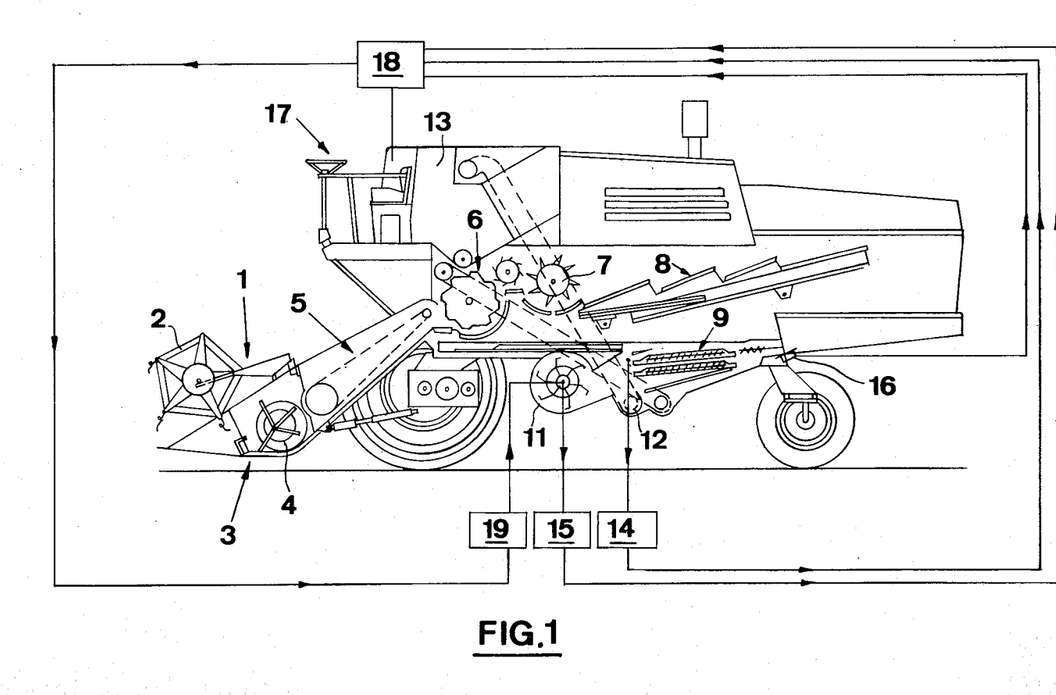
FIG. 1 is a schematic side elevation of the combine harvester showing the major components thereof.

Referring first to FIG. 1, the combine harvester illustrated is of convention design and, as such, the components thereof are well known. However, for ease of reference, a brief general description of the combine harvester will be given. The combine harvester comprises a header 1 having a reel 2 which sweeps crop material towards a cutterbar 3. Cut crop material is consolidated contrally of the machine by an auger 4 and then elevated by an elevator 5 to threshing and separating means indicated generally at 6. Crop material issuing from the threshing and separating means 6 is subjected to the action of a beater 7 and passes therefrom to straw walkers 8 which effect further separation of grain from the remainder of the crop material. Grain which is separated by the threshing and separating means 6, the beater 7, and the straw walkers 8 falls on to sieve means indicated generally at 9. The grain on the sieve means is subjected to a cleaning action by a fan 11 which serves to blow air through the sieve means 9 to remove chaff and impurities such as dust. Clean grain eventually falls to a clean grain auger 12 and is subsequently transferred therefrom to a grain tank 13.

The terms "grain" and "straw" are used throughout this specification for convenience and it should be understood that the terms are not intended to be limiting. Thus "grain" refers to that part of the crop which is threshed and separated from the discardable part of the crop material which is referred to as "straw".

FIG. 1 also shows diagrammatically the basic components of apparatus for adjusting the rotational speed V of the fan 11 as a function of the fore-and-aft inclination of the combine harvester in accordance with the present invention. This apparatus comprises an inclinometer 14 operable to sense the extent and direction of the fore-and-aft inclination of the machine, a fan speed sensor 15, and a grain loss sensor 16, all three of these components producing electrical output signals which are applied as inputs, together with output signals from mechanisms (to be described) which can be set by the operator from an operator's platform 17, to a control device 18 the output signal of which is fed to a fan speed control device 19.

Figure 3:
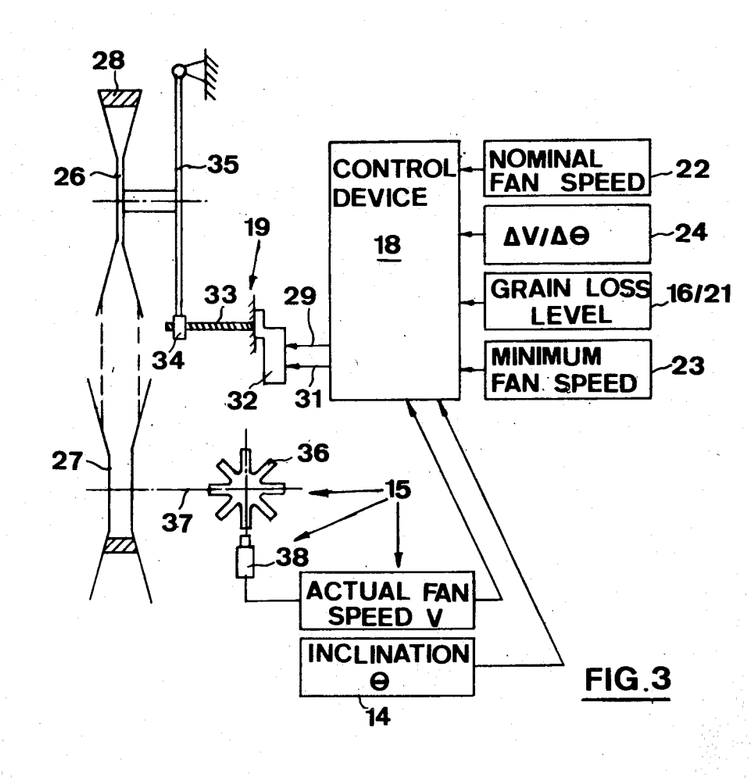
FIG. 3 is a combined schematic and block circuit diagram useful in explaining the general operation of the present invention.

While still considering the fan speed adjustment apparatus in general, FIG. 3 shows a little more detail. The mechanisms which are set by the operator to provide inputs to the control device 18 comprise a grain loss level adjustment mechanism 21 which determines the threshold of the grain loss sensor 16 by way of setting a maximum grain loss, a nominal fan speed adjustment mechanism 22 which sets the rotational speed of the fan 11 for when the machine is generally horizontal and according to the type and condition of the crop being harvested, and a minimum fan speed adjustment mechanism 23 below which minimum speed the fan speed adjustment apparatus cannot command the fan 11 to fall. Again, the minimum fan speed will depend, among other things, on the type and condition of the crop being harvested and is intended to avoid obtaining a dirty grain sample in the grain tank 13.

Figure 2:
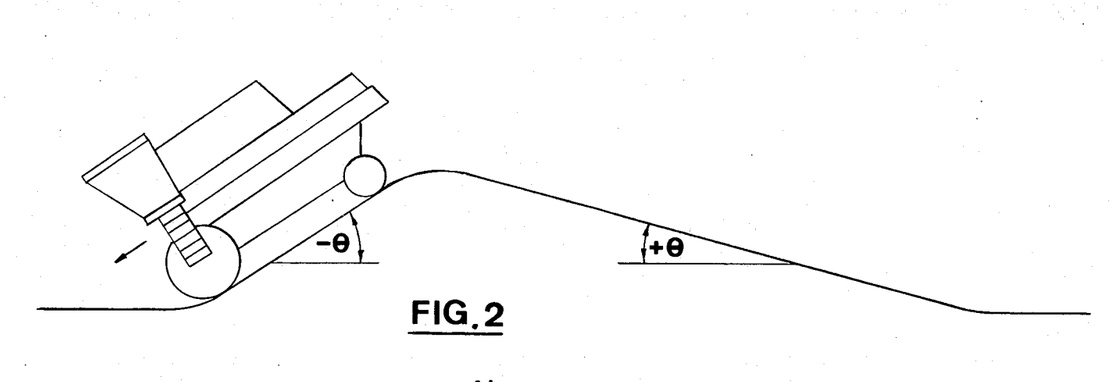
FIG. 2 is a diagram illustrating the convention to be used in the following description with regard to the nature of the incline being experienced by the combine harvester.
Figure 4:
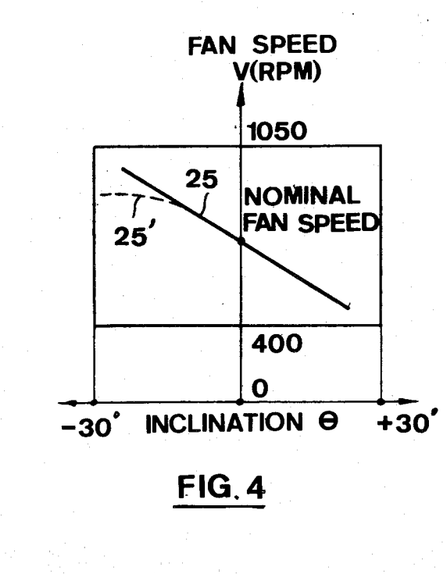
FIG. 4 is a graph also useful in explaining the present invention.

The control device 18 also receives an input from an adjustment mechanism 24, which input is proportional to the ration of the rate change of fan speed ($\Delta V$) to the rate of change of the fore-and-aft inclination ($\Delta \theta$) of the combine harvester. FIG. 4 shows a graph of the inclination $\theta$ against the fan speed V and the relationship between the two has been assumed linear for the present embodiment as indicated by the solid line 25 which crosses the ordinate axis at the selected nominal fan speed. However, it has been found that the relationship is not linear in the ideal situation since fan speed should increase less rapidly as the downward inclination ($-\theta$) increases beyond a certain point, as indicated by the broken line 25'. This ideal relationship can be achieved by the use of appropriate electronic components and circuitry but such are not employed in the present embodiment. FIG. 2 illustrates the convention used throughout this specification to indicate the sense of the fore-and-aft inclination $\theta$ of the combine harvester. If the combine harvester is moving down an incline as represented to the left of FIG. 4, then that inclination is given by $-\theta$. However, when the machine is negotiating an upward incline such as that seen to the right of FIG. 4, then the inclination is given by $+\theta$.

Returning to FIG. 3, the relationship $\Delta V/\Delta\theta$ is intended to be set at the factory but could be available for adjustment by the operator is desired. The output from the control device 18 is used, as already mentioned, to operate a fan speed control device 19 and FIG. 3 shows this device to be in the form, in the present embodiment, of a conventional variator comprising a pulley 26, the two halves of which can be moved relative to each other to vary the effective diameter thereof and hence the drive ratio between that pulley and a pulley 27 to which it is connected by a drive belt 28 and which is attached to the shaft 37 of the fan 11. The output signal from the control device 18 appears on one of two output lines 29, 31, depending on the sense of the signal which in turn depends on the nature of the incline being experienced by the machine (i.e. $+\theta$ or $-\theta$). The output signal actuates an electric motor 32 which rotates a threaded rod 33 in one direction or another, the rod passing through a threaded block 34 attached to one end of a pivoted arm 35 which is connected intermediate its ends to one half of the pulley 26. This half of the pulley 26 is thus either moved towards or away from the other half of the pulley, depending on whether the speed of the fan is to be increased ($-\theta$ incline) or decreased ($+\theta$ incline).

The fan speed sensor 15 is illustrated in FIG. 3 as comprising a toothed wheel 36 mounted on a shaft 37 of the fan 11 adjacent a reed relay 38 which provides an output pulse each time a tooth of the wheel passes. Thus, the frequency of the pulsed output of the relay 38 is proportional to the rotational speed V of the fan 11. It will be appreciated that a number of different types of speed sensor could be employed such as an electromagnetic sensor, or a photoelectric sensor, for example.

Figure 5:
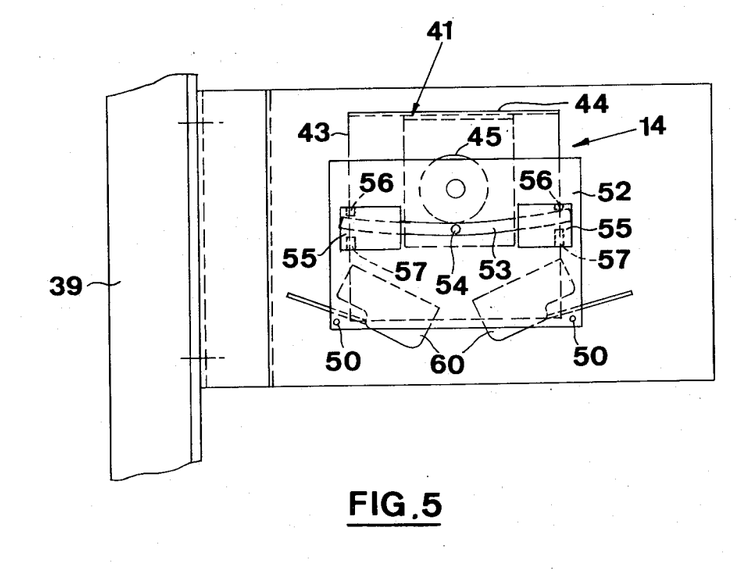
FIG. 5 shows an inclinometer forming part of the present invention.
Figure 6:
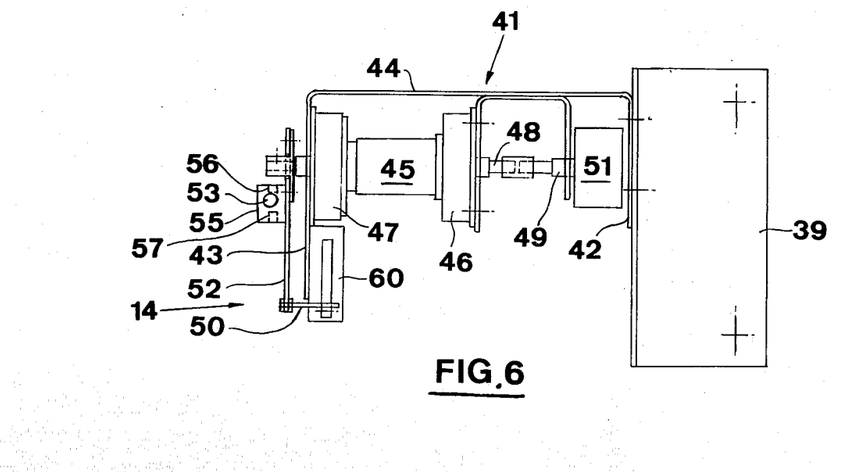
FIG. 6 is an end view of FIG. 5.

Turning now to FIGS. 5 and 6 of the drawings, these show in greater detail the inclinometer 14. The inclinometer 14 serves to sense the extent and direction of the fore-and-aft inclination of the combine harvester and produce an output signal representative thereof which, as already described, forms one input to the control device 18. The inclinometer 14 is mounted on the frame or chassis of the combine harvester as represented at 39 in FIGS. 5 and 6. A mounting bracket 41 is attached to the chassis 39 and is in the form of a U-shaped member having one limb 42 attached to the chassis and the opposed limb 43 carrying certain components of the inclinometer, with other components being supported from the bridging limb 44 of the bracket. More specifically, the bracket 41 carries an electric motor 45 having an output shaft which extends from both ends of the motor and is connected to respective reduction gearboxes 46 and 47. The gearbox 46 has an output shaft 48 connected to the wiper arm 49 of a variable potentiometer 51, and the gearbox 47 has its output shaft extending through the limb 43 of the bracket 41 and carrying thereon a plate 52 which is rigidly attached thereto so as to be rotatable therewith. The reason for the gearboxes 46, 47 having different reductions is that the wiper arm 49 of the potentiometer 51 is capable of rotary movement over an arc of typically 270°, whereas the plate 52 is only arranged for rotary movement over an arc of about 32°.

The plate 52 carries a glass tube 53 which, as seen in FIG. 5, is slightly arcuate so as to stabilize centrally of the tube a metal ball 54 which is contained within the bore of the tube. Each end of the tube 53 extends into a block of material 55 in which is mounted a light source 56, such as a light emitter diode, and an optical receiver 57. Each end of the tube 53 extends between the associated light source 56 and optical receiver 57 and, being transparent, in normal operation does not inhibit the reception of light by the receiver from the light source. However, if the tube 53 is oriented so that the ball 54 rolls to one end, the ball takes up a position in which it interrupts the passage of light from the associated light source 56 to the receiver 57 and, therefore, changes the output signal from the circuit in which the light source and optical receiver are embodied. Each end of the tube 53 is fitted with a resilient bung (not shown) which prevents the ball 54 from bounding back down the tube on hitting the end of the latter. The plate 52 carries two stop members in the form of spigots or rods 50 extending rearwardly therefrom, the rods being engageable with actuating members of respective limit switches 60 which, when operated, serve to de-energize the motor 45. This arrangement serves to safeguard the inclinometer from damage due to the motor 45 attempting to rotate the plate 52, and hence the potentiometer 51, beyond either of its limits.

The inclinometer 14 is mounted in the combine harvester so that when the latter is generally horizontal, the ball 54 is located at the center of the tube 53 and so that the tube is also generally horizontal and extends generally longitudinally of the machine. Thus, when the combine harvester experiences an inclination in the fore-and-aft direction, the ball 54 will roll to one end or other of the tube 53. With the ball 54 in the central position of the tube 53, the electro-optical circuits in which the light sources 56 and optical receivers 57 are embodied are arranged to have zero output to the motor, i.e. when the light paths are established between the respective light sources and associated optical receivers. When one or other of the light paths is interrupted by the sliding of the ball 54 to one end or other of the tube 53, an output from the associated circuit drives the motor 45 in the correct sense so as to return the tube 53 to the original, generally horizontal, position.

As the motor 45 rotates in response to this output signal, it drives the wiper arm 49 of the potentiometer 51 as well as the plate 52 carrying the tube 53 in order to return the latter to the horizontal. The extent of the rotary movement of the wiper arm 49 of the potentiometer 51 is proportional to the inclination $\theta$ being experienced by the combine harvester and the output signal from the potentiometer is used to control the speed of the fan 11 as will be described hereinafter. As soon as the tube 53 is returned to the horizontal, the ball will return to the central position thereof and hence allow the light path between the relevant light source 56 and optical receiver 57 which was previously interrupted by the ball, to be re-established. At this point, the output signal to the motor 45 will be interrupted so that no further movement thereof will occur.

It will be appreciated that once the combine harvester has returned to level ground, the tube 53 will again be out of the horizontal so that the ball 54 will roll to one end which will be the end opposite to that to which it moved when the machine was experiencing the previous incline. Thus, the motor 45 will now be driven in the opposite sense so as again to return the tube to its generally horizontal and original position, and return also the wiper arm 49 of the potentiometer 51 to its original and generally central position.

In the illustrated embodiment, the tube 53 is 10 cms long and has a bore of 5 mm diameter. The diameter of the ball 54 is 4.5 mm and it is found that the close fit of the ball in the tube is such that the resulting damping of the ball movement effected by the air in the tube is sufficient, thereby obviating the need for a special damping fluid.

Figure 7:
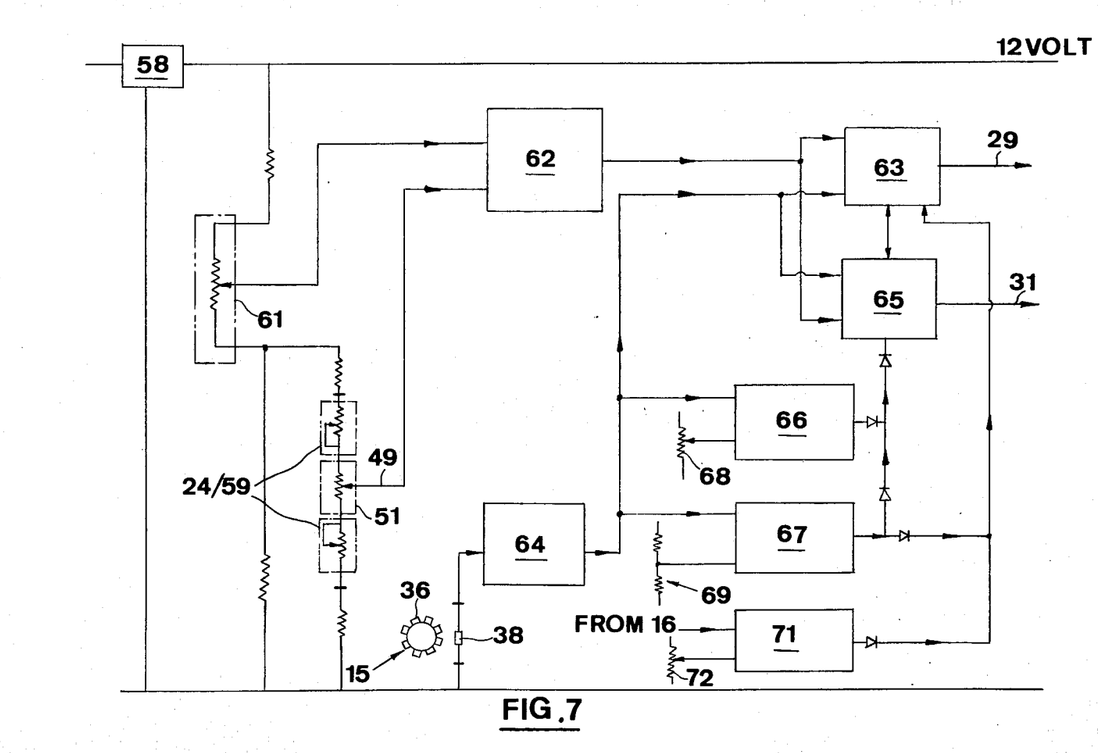
FIG. 7 is a general circuit diagram.
Figure 8:
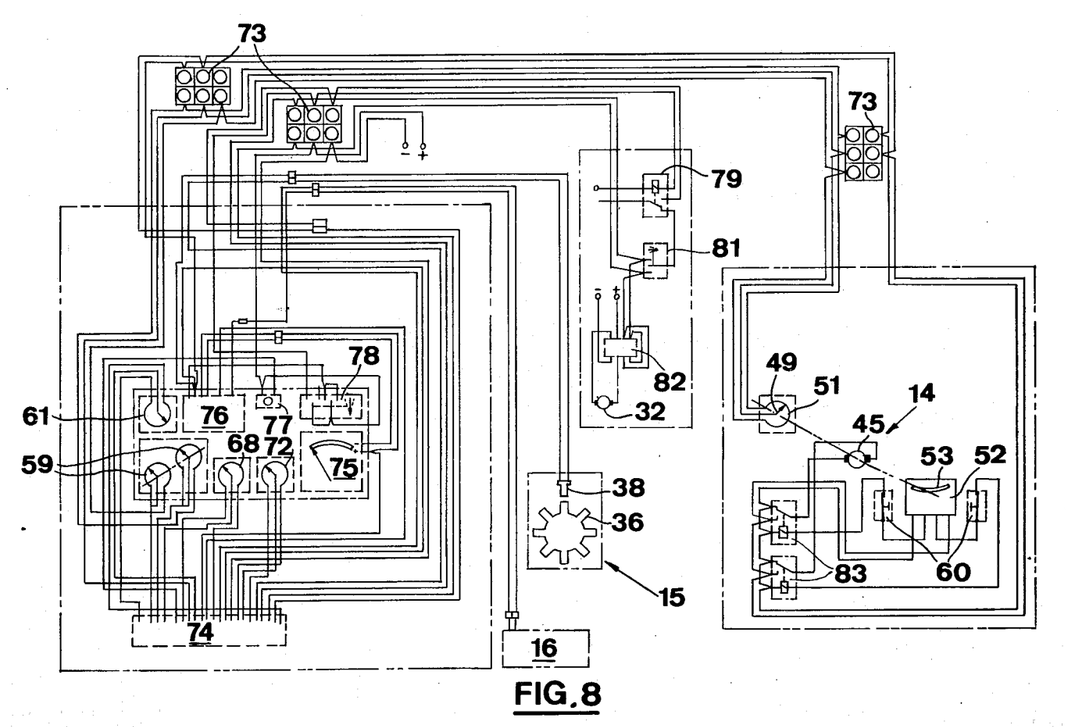
FIG. 8 is a wiring diagram associated with the circuit diagram of FIG. 7.

Having now described in some detail certain of the individual inputs to the overall control apparatus for adjusting the speed of the fan 11, that apparatus will now be described with reference to FIGS. 7 and 8, FIG. 7 being a general block diagram and FIG. 8 being a more specific wiring diagram. The apparatus is energized by a 12 volt supply and a voltage regulator 58 is employed to stabilize this supply. Clearly, the heart of the apparatus is the output from the inclinometer 14 and the potentiometer 51 thereof is shown in FIG. 7 as being in series with a double potentiometer 59 which is variable and which is used for setting the desired ratio of $\Delta V/\Delta\theta$. This double potentiometer 59 is the practical realization of the adjustment mechanism 24 illustrated in FIG. 3.

The parts of the double potentiometer 59 are coupled in series with the potentiometer 51 at the opposite sides thereof and are mechanically coupled to each other so as to be adjustable in unison in the one or other direction, the arrangement being such that the wiper arms of both parts of the double potentiometer 59, upon adjustment, either are both moved towards the potentiometer 51 or are both moved away from the latter. Further connected in series with the potentiometers 51 and 59 is a further variable potentiometer 61 which is used to set the nominal speed of the fan 11, the setting being made, as already mentioned, by the operator in dependence upon the type and conditon of the crop being harvested.

The output signals from the wiper arms of the inclinometer potentiometer 51 and the nominal speed setting potentiometer 61 provide inputs to a combining and grounding circuit 62 which combines and converts the two potentiometer signals to ground reference. The output from the combining circuit 62 has a voltage which is proportional to the required speed of the fan 11 as a function of the inclination $\theta$ inasmuch as the normal speed is effectively compared with that which is indicated as desirable from the combined operation of the double potentiometer 59 and the inclination potentiometer 51. This output signal is applied as one input to a comparator 63, a second input of which is a signal representative of the actual speed of the fan 11 as measured by the toothed wheel 36 and associated sensor 38. The pulsed output from the sensor 38 is converted by a tachometer 64 to a d.c. voltage and it is that signal which is applied as a second input to the comparator 63.

The same two inputs are applied to a further comparator 65, the comparator 63 being operable to produce an output signal when the required fan speed is greater than the actual fan speed, and the comparator 65 being operable to produce an output signal when the required fan speed is less than the actual fan speed. The signal representative of actual fan speed is also applied as an input to a further comparator 66 and a still further comparator 67. The comparator 66 has a second input derived from a variable potentiometer 68 which is used to set the required minimum rotational speed of the fan 11, dependent upon the type and condition of the crop being harvested. If the actual fan speed is greater than the minimum fan speed, than there is zero output from the comparator 66 but when the two signals are equal or the actual fan speed is below the selected minimum then an output signal is developed by the comparator 66 and is applied to the comparator 65 so as to block any output therefrom which would normally call up a further decrease in fan speed.

As regards the comparator 67, a second input is provided from a resistive network 69 which serves as a safety override in case of belt breakage, etc. on the one hand, and for controlling the operating condition at the time when the cleaning mechanism drive is just engaged and as a result the fan speed is still below the minimum set by the potentiometer 68. Again, there is zero output from the comparator 67 if the actual fan speed signal is greater than that from the resistive network but an output is developed in all other circumstances and this output is used to block the output from both the comparator 63 and the comparator 65, thereby rendering the entire fan speed control apparatus inoperative. This thus avoids, among other things, the adjustment mechanism calling for an adjustment of the fan variator when the latter, is not running. Adjustment of the variator under these conditions necessarily would cause damage to the motor 32, for example. This set minimum may be of the order of 400 r.p.m. for example.

Finally, a still further comparator 71 is employed which has as inputs the signal from the grain loss sensor 16 and a signal from a variable potentiometer 72 which is used to set the maximum level of grain loss which is acceptable to the operator. Zero output from the comparator 71 is obtained when the actual grain loss is below the selected maximum but in all other circumstances, an output signal is developed which is used to block the output of comparator 63 only so that increased fan speed can no longer be commanded, which increase is likely to result in even further grain loss.

Thus, there are two output lines from the fan speed adjustment apparatus and these are the output lines from the comparators 63 and 65 and are designated 29 and 31. The same output lines are indicated in FIG. 3 as providing the input signals to the variator 26 which is used to control the speed of the fan 11. As regards the wiring diagram of FIG. 8, the basic components have been indicated by the reference numerals accorded thereto. In addition, there are shown certain connectors at 73 and connections to a printed circuit arrangement indicated at 74 which contains all the non-adjustable components such as the comparators 63, 65, 66, 67 and 71. There is also shown a visual indicator 75 for grain loss and an associated circuit 76. Furthermore, a warning light 77 is shown which is illuminated when the grain loss is in excess of the selected maximum. A manual/automatic switch 78 is provided; when in the "automatic" position, the switch actuates a relay 79 associated with the variator motor 32 used to adjust the rotational speed of the fan 11. On actuation of the relay 79, a manual switch 81 associated with the variator 26 is rendered inoperative. Also associated with the variator motor 32 is a limit switch 82 which prevents the mechanism attempting to set the variator beyond its mechanical limits, and which inevitably would result in damage, and which also serves to give the correct sense of rotation of the motor required to result in the desired increase or decrease in fan speed. As regards the inclinometer 14, FIG. 8 shows the use of two relays 83 to give the correct sense of the signal to the motor 45.

As seen in FIG. 7, blocking diodes are employed in the output lines of the comparators 66, 67 and 71.

In operation of the illustrated embodiment, the operator first sets the switch 78 to "automatic" whereafter he sets the double potentiometer 59 of the adjustment mechanism 24 on zero output, followed by a nominal speed setting, a maximum grain loss setting and a minimum speed setting by means of the respective potentiometers 61, 72 and 68. Thereafter, the double potentiometer 59 is set at its desired setting, which may depend, for example, on the type and condition of the crop. By so doing, the rotational speed of the fan 11 is automatically adjusted in accordance with the fore-and-aft inclination $\theta$ being experienced by the machine and in accordance with the relationship $\Delta V/\Delta\theta$ set up by adjustment of the double potentiometer 59. Thus as the machine experiences a downward inclination ($-\theta$), the tube 53 is tilted out of the horizontal and the ball 54 rolls to one end of the tube to interrupt the illumination of the optical receiver 57 associated with that end and thereby develop an output signal to drive the motor 45 of the inclinometer 14 in a direction to return the tube to the horizontal by rotating the plate 52. At the same time, the motor 45 rotates the wiper arm 49 of the potentiometer 51 to develop an output signal from the latter proportional to the value of $-\theta$, this output signal being used to adjust the speed of the fan in the manner described.

This operation of the fan speed control apparatus continues automatically so that the speed of the fan 11 is always of the nominal value when the machine is generally horizontal, or higher when experiencing $-\theta$ and lower when experiencing $+\theta$. The philosophy of increasing the fan speed for $-\theta$ and decreasing for $+\theta$ is that when the machine is pointing downhill, crop material on the sieve means 9 tends to accumulate towards the front end thereof and therefore requires an additional force to move it rearwardly. This additional force is provided by the increased volume of air being blown onto the sieve means as a result of the increased fan speed. In the case of the machine pointing uphill, the crop material on the sieve means tends to move too quickly over the sieve means so that this movement has to be retarded which is accomplished by decreasing the fan speed.

It will be appreciated from the illustrated embodiment that the present invention provides apparatus for controlling the speed of the fan of a combine harvester in dependence upon the fore-and-aft inclination being experienced by the machine so as to optimize the operation of the machine. It will be seen that the arrangement disclosed is extremely sensitive to fore-and-aft inclination and therefore gives precise and infinite control of the fan speed so as to achieve the desired objective of optimizing the performance of the machine.

Having thus described the invention, what is claimed is:

1. A combine harvester comprising threshing and separating means, sieve means to which crop material separated by the threshing and separating means passes, cleaning means having fan means operable to blow air through the sieve means and hence clean the crop material on the sieve means, the fan means being driven by variable speed drive means, sensor means operable to sense the fore-and-aft inclination of the machine and produce a signal representative thereof, means for selecting a nominal rotational speed for the fan means during operation of the machine on level ground as a function of harvesting conditions and producing a signal representative of the nominal speed, means for combining the inclination signal and the nominal speed signal to produce a signal representative of the desired speed of the fan means as a function of the fore-and-aft inclination of the machine, means for measuring the actual rotational speed of the fan means, means for establishing a selected relationship between the fore-and-aft inclination of the combine harvester and the rotational speed of the fan means and adjusting the signal from the sensor means accordingly, such that the adjusted signal is proportional to the desired fan speed as a function of the fore-and-aft inclination, said means for establishing said selected relationship being in the form of a double potentiometer having a pair of electrical resistances and a wiper arm associated with each resistance, each said electrical resistance being coupled in series with the sensor means operable to sense the fore-and-aft inclination of the machine therebetween, said wiper arms being mechanically coupled to each other for adjustment in unison in a manner such that, upon adjustment, the wiper arms both move in the same direction relative to the centrally disposed sensor means, and control means responsive to the desired fan speed signal and the actual fan speed signal to produce a command signal for application to the variable speed drive means, whereby the rotational speed of the fan means is adjusted as a function of the fore-and-aft inclination of the machine.

2. A combine harvester according to claim 1 wherein the means for setting a nominal rotational speed for the fan means which pertains when the machine is on generally level ground, are formed by a potentiometer.

3. A combine harvester according to claim 1 or 2, wherein means are provided for setting a minimum rotational speed for the fan means below which speed the fan means cannot be commanded to fall.

4. A combine harvester according to claim 3, wherein grain loss monitor means are provided which are operable to produce a signal representative of the actual grain losses, the grain loss signal being used to prevent any further increase in the rotational speed of the fan means being commanced when that signal reaches a predetermined value.

5. A combine harvester according to claim 4, when the grain loss monitor means comprise a grain loss sensor associated with the sieve means and operable to sense the volume of grain spilling over the rear edge of the sieve means at the location of the sensor, and means for establishing a signal representative of a predetermined maximum grain loss, any further increase in the rotational speed of the fan means being prevented once the grain loss signal exceeds the predetermined maximum grain loss signal.

6. A combine harvester according to claim 5, wherein said means for establishing a maximum grain loss signal comprise a variable potentiometer, whereby the predetermined grain loss can be adjusted.

7. A combine harvester according to claim 3 wherein means are provided for preventing the commanding of any further alteration in the rotational speed of the fan means upon the failure of selected components such as drive belts, said means for preventing the commanding of further alteration also being operable when the rotational speed of the fan means is below a predetermined value.

8. A combine harvester according to claim 3 wherein the control means comprise two comparator means to each of which are applied the desired fan speed signal and the actual fan speed signal, one comparator means being arranged to produce an output signal to command an increase in the rotational speed of the fan means when the actual fan speed is less than the desired fan speed, and the other comparator means being arranged to produce an output signal to command a decrease in the rotational speed of the fan means when the actual fan speed is greater than the desired fan speed, the one comparator means being inhibited whenever the maximum grain loss is exceeded, the other comparator means being inhibited whenever the actual fan speed falls below the selected minimum fan speed, and both comparator means being inhibited whenever the rotational speed of the fan means is below a set value.

* * * * *